US011708441B2

(12) United States Patent
Choung et al.

(10) Patent No.: US 11,708,441 B2
(45) Date of Patent: Jul. 25, 2023

(54) LATEX COMPOSITION FOR DIP MOLDING AND DIP-MOLDED ARTICLE INCLUDING THE SAME

(71) Applicant: Korea Kumho Petrochemical Co., Ltd., Seoul (KR)

(72) Inventors: Sung Hun Choung, Daejeon (KR); Jong Jin Jeon, Sejong-si (KR); Kun-Ho Yang, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 136 days.

(21) Appl. No.: 17/176,729

(22) Filed: Feb. 16, 2021

(65) Prior Publication Data

US 2021/0253768 A1 Aug. 19, 2021

(30) Foreign Application Priority Data

Feb. 17, 2020 (KR) ........................ 10-2020-0018774

(51) Int. Cl.
| | | |
|---|---|---|
| *C08F 236/08* | (2006.01) | |
| *C08F 236/12* | (2006.01) | |
| *C08F 236/14* | (2006.01) | |
| *C08L 9/04* | (2006.01) | |
| *C08L 13/02* | (2006.01) | |
| *B29C 41/14* | (2006.01) | |
| *A41D 19/00* | (2006.01) | |

(52) U.S. Cl.
CPC ........ *C08F 236/08* (2013.01); *A41D 19/0096* (2013.01); *B29C 41/14* (2013.01); *C08F 236/12* (2013.01); *C08F 236/14* (2013.01); *C08L 9/04* (2013.01); *C08L 13/02* (2013.01)

(58) Field of Classification Search
CPC .......... C08J 5/02; B29C 41/003; B29C 41/14; C08L 13/02; C08L 9/00; C08L 9/02; C08L 9/04; C08L 9/10; C08F 236/08; C08F 236/12; C08F 236/14
See application file for complete search history.

(56) References Cited

U.S. PATENT DOCUMENTS

| | | | |
|---|---|---|---|
| 2010/0237541 A1 | | 9/2010 | Su |
| 2017/0342243 A1* | | 11/2017 | Kato .................... B29C 41/003 |

FOREIGN PATENT DOCUMENTS

| | | | |
|---|---|---|---|
| CN | 107001656 | A | 8/2017 |
| GB | 1480112 | A | 7/1977 |
| KR | 20170060793 | A | 6/2017 |
| KR | 10-2017-0098853 | A | 8/2017 |
| KR | 20170098852 | A | 8/2017 |
| KR | 20170098853 | A | 8/2017 |
| KR | 20180066819 | A | 8/2017 |
| WO | 2007004459 | A1 | 1/2007 |
| WO | 2016104058 | A1 | 6/2016 |

* cited by examiner

*Primary Examiner* — Christopher M Rodd
(74) *Attorney, Agent, or Firm* — NKL Law; Jae Youn Kim

(57) ABSTRACT

According to an exemplary embodiment of the present invention, provided is a latex composition for dip molding, which includes a copolymer latex formed by polymerizing an isoprene monomer, an ethylenically unsaturated nitrile monomer, and an ethylenically unsaturated acid monomer, wherein a dip-molded article made of the latex composition for dip molding exhibits a durability test result of 45 minutes or more.

9 Claims, No Drawings

LATEX COMPOSITION FOR DIP MOLDING AND DIP-MOLDED ARTICLE INCLUDING THE SAME

CROSS-REFERENCE TO RELATED APPLICATION

This application claims priority to and the benefit of Korean Patent Application No. 2020-0018774, filed on Feb. 17, 2020, the disclosure of which is incorporated herein by reference in its entirety.

BACKGROUND

1. Field of the Invention

The present invention relates to a latex composition for dip molding, and specifically, to a latex composition for dip molding which has excellent durability during actual use.

2. Discussion of Related Art

Conventional dip-molded articles such as medical, food, testing, and laboratory gloves, condoms, and the like were made of natural rubber latex as a main raw material. However, the natural rubber latex molded articles include proteins, which results in a contact allergic reaction in a user, causing rashes, itching, the common cold, and the like. For this reason, the use of nitrile rubber latex molded articles made of an acrylonitrile-butadiene-based copolymer latex, which is synthetic rubber latex not including proteins, as a main raw material is increasing.

As latex for dip molding is increasingly used, there is a need for quality improvement, and attempts have been recently made to improve the durability of a dip-molded article made of latex for dip molding, such as tensile strength, an elongation rate, and the like. However, despite the attempts to improve mechanical properties, cases in which fatal accidents occur due to breakage of the dip-molded article and in which the desired purpose is not achieved have continuously occurred.

This is because the molded article is in contact with human skin or body fluids such as sweat and the like, which are weakly acidic, when actually used, such that the properties thereof deteriorate. Conventionally, when mechanical properties such as tensile strength and an elongation rate are excellent as measured at room temperature under an air atmosphere, it is possible to ensure durability prior to use of the dip-molded article, but durability under actual use conditions is poor.

Therefore, there is a need to develop a technique for manufacturing a dip-molded article having excellent durability under actual use conditions.

SUMMARY OF THE INVENTION

The present invention is directed to provide a latex composition for dip molding, which is intended to manufacture a dip-molded article having excellent durability under actual use conditions.

One aspect of the present invention provides a latex composition for dip molding, which includes a copolymer latex formed by polymerizing an isoprene monomer, an ethylenically unsaturated nitrile monomer, and an ethylenically unsaturated acid monomer, wherein a dip-molded article made of the latex composition for dip molding exhibits a durability test result of 45 minutes or more:

[Durability Test Method]

A dip-molded article with a width of 30 mm, a length of 135 mm, and a thickness of 0.06 to 0.08 mm is elongated by 20% in a lengthwise direction and immersed in a solution set to 35° C. and pH 4.0 to pH 4.3, and the molded article is elongated in a lengthwise direction for 10 seconds so that an elongation rate reaches 50%, maintained for 2 seconds, and then relaxed in a lengthwise direction for 10 seconds so that an elongation rate reaches 20%, and while repeating this process, the time taken for the molded article to be broken is measured.

In an exemplary embodiment, the ethylenically unsaturated nitrile monomer may be one or more selected from the group consisting of acrylonitrile, methacrylonitrile, fumaronitrile, α-chloronitrile, and α-cyanoethyl acrylonitrile.

In an exemplary embodiment, the ethylenically unsaturated acid monomer may be one or more selected from the group consisting of acrylic acid, methacrylic acid, itaconic acid, maleic acid, fumaric acid, maleic anhydride, citraconic anhydride, styrene sulfonate, monobutyl fumarate, monobutyl maleate, and mono-2-hydroxypropyl maleate.

In an exemplary embodiment, the copolymer latex may include a copolymer formed by polymerizing: 30 to 90 parts by weight of the isoprene monomer; 1 to 55 parts by weight of the ethylenically unsaturated nitrile monomer; and 0.001 to 20 parts by weight of the ethylenically unsaturated acid monomer.

In an exemplary embodiment, the copolymer latex may be formed by polymerization further using water, an emulsifier, a polymerization initiator, and a molecular-weight control agent.

In an exemplary embodiment, the molecular-weight control agent may be used in an amount of 0.1 to 1 part by weight based on 100 parts by weight of the total monomers of the copolymer latex.

In an exemplary embodiment, the latex composition for dip molding may further include, based on 100 parts by weight of the total monomers of the copolymer latex, 0.1 to 1 part by weight of zinc oxide, 1 to 2 parts by weight of sulfur, and 0.3 to 1.5 parts by weight of a vulcanization accelerator.

In an exemplary embodiment, the latex composition for dip molding may further include one or more additives selected from the group consisting of a chelating agent, a dispersant, a pH control agent, a deoxygenating agent, a particle size control agent, an anti-aging agent, and an oxygen scavenger.

In an exemplary embodiment, the latex composition for dip molding may have a solid content of 15 to 25%.

In an exemplary embodiment, a dip-molded article made of the latex composition for dip molding may exhibit a durability test result of 60 minutes or more, a tensile strength of the dip-molded article may be 10 MPa or more, and an elongation rate of the dip-molded article may be 600% or more.

Another aspect of the present invention provides a dip-molded article made of the above-described latex composition for dip molding.

In an exemplary embodiment, the dip-molded article may be a medical glove, a glove for processing agricultural and livestock products, an industrial glove, a condom, a catheter, or a molded article for health care.

DETAILED DESCRIPTION OF EXEMPLARY EMBODIMENTS

Hereinafter, the present invention will be described with reference to some of the various embodiments of the present invention. However, the present invention may be embodied in several different forms, and therefore, is not limited to embodiments described herein.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

When a numerical value is presented herein, the value has the precision of the significant digit provided in accordance with the standard rules in chemistry for significant digits unless its specific range is stated otherwise. For example, the numerical value 10 includes the range of 5.0 to 14.9 and the numerical value 10.0 includes the range of 9.50 to 10.49.

Hereinafter, the present invention will be described in detail.

Latex Composition for Dip Molding

A latex composition for dip molding according to one aspect of the present invention includes a copolymer latex formed by polymerizing an isoprene monomer, an ethylenically unsaturated nitrile monomer, and an ethylenically unsaturated acid monomer, and a dip-molded article made of the latex composition for dip molding may exhibit a durability test result of 45 minutes or more, 60 minutes or more, 75 minutes or more, 90 minutes or more, 105 minutes or more, 120 minutes or more, 135 minutes or more, 150 minutes or more, 165 minutes or more, 180 minutes or more, 195 minutes or more, 210 minutes or more, 225 minutes or more, or 240 minutes or more:

[Durability Test Method]

A dip-molded article with a width of 30 mm, a length of 135 mm, and a thickness of 0.06 to 0.08 mm is elongated by 20% in a lengthwise direction and immersed in a solution set to 35° C. and pH 4.0 to pH 4.3, and the molded article is elongated in a lengthwise direction for 10 seconds so that an elongation rate reaches 50%, maintained for 2 seconds, and then relaxed in a lengthwise direction for 10 seconds so that an elongation rate reaches 20%, and while repeating this process, the time taken for the molded article to be broken is measured.

The durability test method is intended to confirm whether a specimen is broken by repetitive elongation and relaxation in a solution set to 35° C. and pH 4.0 to pH 4.3, which are conditions similar to skin and body fluids with which the dip-molded article is highly likely to be in contact when actually used. For example, when the molded article is a glove, a situation in which the molded article is repeatedly elongated and relaxed according to the movement of fingers may be simulated to measure the durability of the dip-molded article under actual use conditions.

When the durability test result is less than 45 minutes, a durability improvement effect under actual use conditions may be insignificant compared to a conventional latex composition for dip molding.

The copolymer latex may include structures derived from an isoprene monomer, an ethylenically unsaturated nitrile monomer, and an ethylenically unsaturated acid monomer. A structure derived from the isoprene monomer may impart flexibility to the dip-molded article. When the isoprene monomer is used as a main raw material of the copolymer latex, durability under actual use conditions may be excellent.

A structure derived from the ethylenically unsaturated nitrile monomer may improve the strength and chemical resistance of the dip-molded article. The ethylenically unsaturated nitrile monomer may be one or more selected from the group consisting of acrylonitrile, methacrylonitrile, fumaronitrile, α-chloronitrile, and α-cyanoethyl acrylonitrile.

A structure derived from the ethylenically unsaturated acid monomer may maintain the properties of the dip-molded article by forming a crosslinked structure. The ethylenically unsaturated acid monomer may be one or more selected from the group consisting of acrylic acid, methacrylic acid, itaconic acid, maleic acid, fumaric acid, maleic anhydride, citraconic anhydride, styrene sulfonate, monobutyl fumarate, monobutyl maleate, and mono-2-hydroxypropyl maleate.

As an example, the copolymer latex may include 30 to 90 parts by weight of the isoprene monomer, 1 to 55 parts by weight of the ethylenically unsaturated nitrile monomer, and 0.001 to 20 parts by weight of the ethylenically unsaturated acid monomer.

For example, the isoprene monomer may be included in an amount of 30 parts by weight, 32.5 parts by weight, 35 parts by weight, 37.5 parts by weight, 40 parts by weight, 42.5 parts by weight, 45 parts by weight, 47.5 parts by weight, 50 parts by weight, 52.5 parts by weight, 55 parts by weight, 57.5 parts by weight, 60 parts by weight, 62.5 parts by weight, 65 parts by weight, 67.5 parts by weight, 70 parts by weight, 72.5 parts by weight, 75 parts by weight, 77.5 parts by weight, 80 parts by weight, 82.5 parts by weight, 85 parts by weight, 87.5 parts by weight, or 90 parts by weight. When the content of the isoprene monomer is less than 30 parts by weight, a dip-molded article is excessively cured, and thus poor wearing comfort may be exhibited. On the other hand, when the content of the isoprene monomer is more than 90 parts by weight, a reaction rate in the formation of the copolymer latex may be excessively low.

The ethylenically unsaturated nitrile monomer may be included in an amount of 1 part by weight, 2.5 parts by weight, 5 parts by weight, 7.5 parts by weight, 10 parts by weight, 12.5 parts by weight, 15 parts by weight, 17.5 parts by weight, 20 parts by weight, 22.5 parts by weight, 25 parts by weight, 27.5 parts by weight, 30 parts by weight, 32.5 parts by weight, 35 parts by weight, 37.5 parts by weight, 40 parts by weight, 42.5 parts by weight, 45 parts by weight, 47.5 parts by weight, 50 parts by weight 52.5 parts by weight, or 55 parts by weight. When the content of the ethylenically unsaturated nitrile monomer is less than 1 part by weight, the chemical resistance or mechanical strength of a dip-molded article may be degraded. On the other hand, when the content of the ethylenically unsaturated nitrile monomer is more than 55 parts by weight, the elongation rate of a dip-molded article is degraded, and thus usability may be degraded.

The ethylenically unsaturated acid monomer may be included in an amount of 0.001 parts by weight, 0.5 parts by weight, 1 part by weight, 1.5 parts by weight, 2 parts by weight, 2.5 parts by weight, 3 parts by weight, 3.5 parts by weight, 4 parts by weight, 4.5 parts by weight, 5 parts by weight, 5.5 parts by weight, 6 parts by weight, 6.5 parts by weight, 7 parts by weight, 7.5 parts by weight, 8 parts by weight, 8.5 parts by weight, 9 parts by weight, 9.5 parts by weight, 10 parts by weight, 10.5 parts by weight, 11 parts by weight, 11.5 parts by weight, 12 parts by weight, 12.5 parts by weight, 13 parts by weight, 13.5 parts by weight, 14 parts by weight, 14.5 parts by weight, 15 parts by weight, 15.5 parts by weight, 16 parts by weight, 16.5 parts by weight, 17 parts by weight, 17.5 parts by weight, 18 parts by weight, 18.5 parts by weight, 19 parts by weight, 19.5 parts by weight, or 20 parts by weight. When the content of the ethylenically unsaturated acid monomer is less than 0.001 parts by weight, the tensile strength of a dip-molded article may be degraded. On the other hand, when the content of the ethylenically unsaturated acid monomer is more than 20 parts by weight, a dip-molded article is excessively cured, and thus wearing comfort may be degraded.

As used herein, the "total monomers" mean the sum of the isoprene monomer, the ethylenically unsaturated nitrile monomer, and the ethylenically unsaturated acid monomer. However, the copolymer latex may further include a structure derived from a polymerizable monomer in addition to the structures derived from the above-described isoprene monomer, ethylenically unsaturated nitrile monomer, and ethylenically unsaturated acid monomer without a durability test result departing from the above-described range. In this case, the "total monomers" further include the polymerizable monomer.

The copolymer latex may be formed by polymerization further using water, an emulsifier, a polymerization initiator, and a molecular-weight control agent.

The water may be used in an amount of 100 to 120 parts by weight based on 100 parts by weight of the total monomers. When the content of water is less than 100 parts by weight, viscosity is excessively increased, and thus it may be difficult to manufacture a molded article, and when the content of water is more than 120 parts by weight, a solid content may be excessively decreased.

The emulsifier may be an anionic surfactant, a non-ionic surfactant, a cationic surfactant, or an amphoteric surfactant. For example, as the anionic surfactant, one or more selected from the group consisting of alkylbenzene sulfonates, aliphatic sulfonates, ester sulfates of higher alcohols, α-olefin sulfonates, and alkyl ether ester sulfates may be used, but the present invention is not limited thereto. The emulsifier may be used in an amount of 0.8 to 8 parts by weight, for example, 0.8 parts by weight, 1.0 parts by weight, 1.2 parts by weight, 1.4 parts by weight, 1.6 parts by weight, 1.8 parts by weight, 2.0 parts by weight, 2.2 parts by weight, 2.4 parts by weight, 2.6 parts by weight, 2.8 parts by weight, 3.0 parts by weight, 3.2 parts by weight, 3.4 parts by weight, 3.6 parts by weight, 3.8 parts by weight, 4.0 parts by weight, 4.2 parts by weight, 4.4 parts by weight, 4.6 parts by weight, 4.8 parts by weight, 5.0 parts by weight, 5.2 parts by weight, 5.4 parts by weight, 5.6 parts by weight, 5.8 parts by weight, 6.0 parts by weight, 6.2 parts by weight, 6.4 parts by weight, 6.6 parts by weight, 6.8 parts by weight, 7.0 parts by weight, 7.2 parts by weight, 7.4 parts by weight, 7.6 parts by weight, 7.8 parts by weight, or 8.0 parts by weight based on 100 parts by weight of the total monomers.

The polymerization initiator may be a radical initiator. The radical initiator may be, for example, one or more among an inorganic peroxide selected from the group consisting of sodium persulfate, potassium persulfate, ammonium persulfate, potassium superphosphate, and hydrogen peroxide; an organic peroxide selected from the group consisting of t-butylperoxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanoyl peroxide, and t-butyl peroxy isobutyrate; and an azo-based initiator selected from the group consisting of azobisisobutyronitrile, azobis-2,4-dimethylvaleronitrile, azobis cyclohexane carbonitrile, and azobis butyric acid methyl, but the present invention is not limited thereto. The polymerization initiator may be used in an amount of 0.01 to 1.5 parts by weight, for example, 0.01 parts by weight, 0.10 parts by weight, 0.20 parts by weight, 0.30 parts by weight, 0.40 parts by weight, 0.50 parts by weight, 0.60 parts by weight, 0.70 parts by weight, 0.80 parts by weight, 0.90 parts by weight, 1.00 parts by weight, 1.10 parts by weight, 1.20 parts by weight, 1.30 parts by weight, 1.40 parts by weight, or 1.50 parts by weight based on 100 parts by weight of the total monomers.

The molecular-weight control agent may be a mercaptan such as an α-methylstyrene dimer, t-dodecyl mercaptan, n-dodecyl mercaptan, octyl mercaptan, etc.; a halogenated hydrocarbon such as carbon tetrachloride, methylene chloride, methylene bromide, etc.; or a sulfur-containing compound such as tetraethylthiuram disulfide, dipentamethylenethiuram disulfide, diisopropyl xanthogen disulfide, etc., but the present invention is not limited thereto. The molecular-weight control agent may be used in an amount of 0.1 to 1 part by weight based on 100 parts by weight of the total monomers of the copolymer latex. For example, the molecular-weight control agent may be used in an amount of 0.1 parts by weight, 0.15 parts by weight, 0.2 parts by weight, 0.25 parts by weight, 0.3 parts by weight, 0.35 parts by weight, 0.4 parts by weight, 0.45 parts by weight, 0.5 parts by weight, 0.55 parts by weight, 0.6 parts by weight, 0.65 parts by weight, 0.7 parts by weight, 0.75 parts by weight, 0.8 parts by weight, 0.85 parts by weight, 0.9 parts by weight, 0.95 parts by weight, or 1 part by weight. When the content of the molecular-weight control agent is less than 0.1 parts by weight, latex stability may be degraded due to the production of a gel, and when the content of the molecular-weight control agent is more than 1 part by weight, not only poor tensile strength and degraded stress retention may result, but also durability during actual use may be degraded.

The copolymer latex may have a solid content of 35 to 65% and a pH of 7.0 to 9.0.

The latex composition for dip molding may further include, based on 100 parts by weight of the total monomers of the copolymer latex, 0.1 to 1 part by weight of zinc oxide, 1 to 2 parts by weight of sulfur, and 0.3 to 1.5 parts by weight of a vulcanization accelerator. The latex composition for dip molding may further include an aqueous potassium hydroxide solution.

The zinc oxide may form an ionic bond together with the structure derived from the ethylenically unsaturated acid to form a crosslinked structure. The zinc oxide may be included, for example, in an amount of 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, or 1 part by weight. When the content of zinc oxide is excessively low, durability during actual use may be degraded, and when the content of zinc oxide is excessively high, tensile strength may be degraded.

The sulfur may react with the structure derived from the isoprene monomer to form a crosslinked structure. The sulfur may be included, for example, in an amount of 1 part by weight, 1.1 parts by weight, 1.2 parts by weight, 1.3 parts by weight, 1.4 parts by weight, 1.5 parts by weight, 1.6 parts by weight, 1.7 parts by weight, 1.8 parts by weight, 1.9 parts by weight, or 2.0 parts by weight. When the content of sulfur is less than 1 part by weight, mechanical properties such as tensile strength and the like and durability during actual use may be degraded, and when the content of sulfur is more than 2 parts by weight, an allergic reaction may be caused in a user.

The vulcanization accelerator may be included, for example, in an amount of 0.3 parts by weight, 0.4 parts by weight, 0.5 parts by weight, 0.6 parts by weight, 0.7 parts by weight, 0.8 parts by weight, 0.9 parts by weight, 1 part by weight, 1.1 parts by weight, 1.2 parts by weight, 1.3 parts by weight, 1.4 parts by weight, or 1.5 parts by weight. Alternatively, the vulcanization accelerator may be added at 50 to 75 wt % relative to the addition amount of the sulfur.

The latex composition for dip molding may further include one or more additives selected from the group consisting of a chelating agent, a dispersant, a pH control agent, a deoxygenating agent, a particle size control agent, an anti-aging agent, and an oxygen scavenger. As these additives, materials known in the art may be used, and descriptions about types, functions, and addition amounts thereof will be omitted.

The latex composition for dip molding may have a solid content of 15 to 25%, for example, 15%, 16%, 17%, 18%, 19%, 20%, 21%, 22%, 23%, 24%, or 25%. For example, the latex composition for dip molding may have a controlled solid content of 15 to 25% by adding an aqueous potassium hydroxide solution to a copolymer latex having a solid content of 35 to 65%, for example, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, or 65%, but the present invention is not limited thereto.

A dip-molded article made of the latex composition for dip molding may have a tensile strength of 3 MPa or more, 5 MPa or more, 7 MPa or more, 9 MPa or more, 11 MPa or more, 13 MPa or more, 15 MPa or more, 20 MPa or more, 25 MPa or more, 30 MPa or more, or 35 MPa or more, but the present invention is not limited thereto. As the tensile strength is higher, durability during storage is improved, but other mechanical properties such as an elongation rate and the like may be degraded.

The dip-molded article made of the latex composition for dip molding may have an elongation rate of 600% or more, 650% or more, 700% or more, 750% or more, 800% or more, 850% or more, or 900% or more, but the present invention is not limited thereto. As the elongation rate is higher, wearing comfort and the like are improved, but it may have a trade-off relationship with other mechanical properties.

The dip-molded article made of the latex composition for dip molding may exhibit a durability test result of 60 minutes or more, the tensile strength of the dip-molded article may be 10 MPa or more, and the elongation rate of the dip-molded article may be 600% or more. Unlike a conventional butadiene-based latex composition for dip molding, the latex composition for dip molding according to one aspect of the present invention maintains minimal levels of tensile strength and an elongation rate and simultaneously exhibits excellent durability during actual use, as determined by a durability test. Therefore, the latex composition can be used to manufacture a high-quality dip-molded article.

A dip-molded article according to another aspect of the present invention may be made of the above-described latex composition for dip molding. Each characteristic of the dip-molded article has been described above.

The dip-molded article may be a medical glove, a glove for processing agricultural and livestock products, an industrial glove, a condom, a catheter, or a molded article for health care.

Hereinafter, exemplary embodiments of the present invention will be described in more detail. However, hereinafter, only experimental results obtained from a few selected exemplary embodiments of the present invention will be described, and the scope and contents of the present invention should not be interpreted as being reduced or limited by the few selected exemplary embodiments. The effects of each of the various embodiments of the present invention which are not explicitly set forth below will be described in detail in relevant sections.

Preparation Example

A 1 L high-pressure reactor equipped with a stirrer, a thermometer, a cooler, and a nitrogen gas inlet and designed to allow continuous addition of individual components was provided. The reactor was purged with nitrogen, and a monomer mixture of isoprene (IPM), acrylonitrile (AN), and methacrylic acid (MAA) was input into the reactor. t-Dodecyl mercaptan (TDDM) as a molecular-weight control agent, 2 parts by weight of sodium alkylbenzene sulfonate as an emulsifier, and 120 parts by weight of ion-exchanged water were input into the reactor. A temperature inside the reactor was raised to about 25 to 45° C., and then 0.3 parts by weight of potassium persulfate as a polymerization initiator was input into the reactor. When a conversion rate reached about 95% based the monomer mixture, 0.9 parts by weight of sodium hydroxide was added, and the polymerization reaction was stopped. Then, unreacted monomers were removed through a deodorization process, and ammonia water, an antioxidant, an antifoaming agent, and the like were added, thereby obtaining a carboxylic acid-modified isoprene-nitrile-based copolymer latex having a solid concentration of 45% and a pH of 8.5.

Comparative Preparation Example

A copolymer latex was obtained in the same manner as in Preparation Example except that 1,3-butadiene was added instead of isoprene.

Examples and Comparative Examples

Sulfur (S), zinc oxide (ZnO), and zinc dibutyldithiocarbamate (ZDBC) as a vulcanization accelerator were added to 100 parts by weight of the latex obtained in each of Preparation Example or Comparative Preparation Example. Then, a 4% aqueous potassium hydroxide solution and secondary distilled water were added to prepare a composition for dip molding having a solid concentration of 20% and a pH of 10.0.

The addition amounts of each component used in Preparation Example, Comparative Preparation Example, Examples, and Comparative Examples are shown in the following Table 1.

TABLE 1

| Classification | IPM | BD | AN | MAA | TDDM | S | ZnO | ZDBC |
|---|---|---|---|---|---|---|---|---|
| Example 1 | 68 | 0 | 29 | 3 | 0.4 | 1.2 | 0.6 | 0.7 |
| Example 2 | 73 | 0 | 24 | 3 | 0.4 | 1.2 | 0.6 | 0.7 |
| Example 3 | 78 | 0 | 19 | 3 | 0.4 | 1.2 | 0.6 | 0.7 |
| Example 4 | 75 | 0 | 24 | 1 | 0.4 | 1.2 | 0.6 | 0.7 |
| Example 5 | 74 | 0 | 24 | 2 | 0.4 | 1.2 | 0.6 | 0.7 |
| Example 6 | 73.5 | 0 | 24 | 2.5 | 0.4 | 1.2 | 0.6 | 0.7 |
| Example 7 | 72.5 | 0 | 24 | 3.5 | 0.4 | 1.2 | 0.6 | 0.7 |
| Example 8 | 71 | 0 | 24 | 5 | 0.4 | 1.2 | 0.6 | 0.7 |
| Example 9 | 74 | 0 | 24 | 2 | 0.1 | 1.8 | 0.7 | 1.2 |
| Example 10 | 74 | 0 | 24 | 2 | 0.3 | 1.8 | 0.7 | 1.2 |
| Example 11 | 74 | 0 | 24 | 2 | 0.4 | 1.8 | 0.7 | 1.2 |
| Example 12 | 74 | 0 | 24 | 2 | 0.45 | 1.8 | 0.7 | 1.2 |
| Example 13 | 74 | 0 | 24 | 2 | 0.5 | 1.8 | 0.7 | 1.2 |
| Example 14 | 74 | 0 | 24 | 2 | 0.45 | 1.8 | 0.6 | 1.2 |
| Example 15 | 74 | 0 | 24 | 2 | 0.45 | 1.8 | 0.8 | 1.2 |
| Example 16 | 74 | 0 | 24 | 2 | 0.45 | 1.2 | 0.6 | 0.7 |

TABLE 1-continued

| Classification | IPM | BD | AN | MAA | TDDM | S | ZnO | ZDBC |
|---|---|---|---|---|---|---|---|---|
| Example 17 | 74 | 0 | 24 | 2 | 0.45 | 1.2 | 0.8 | 0.7 |
| Comparative Example 1 | 0 | 68 | 29 | 3 | 0.4 | 1.2 | 0.6 | 0.7 |
| Comparative Example 2 | 0 | 73 | 24 | 3 | 0.4 | 1.2 | 0.6 | 0.7 |
| Comparative Example 3 | 0 | 78 | 19 | 3 | 0.4 | 1.2 | 0.6 | 0.7 |
| Comparative Example 4 | 0 | 74 | 24 | 2 | 0.3 | 1.8 | 0.7 | 1.2 |
| Comparative Example 5 | 0 | 74 | 24 | 2 | 0.4 | 1.8 | 0.7 | 1.2 |
| Comparative Example 6 | 0 | 74 | 24 | 2 | 0.5 | 1.8 | 0.7 | 1.2 |
| Comparative Example 7 | 0 | 74 | 24 | 2 | 0.45 | 1.8 | 0.6 | 1.2 |
| Comparative Example 8 | 0 | 74 | 24 | 2 | 0.45 | 1.2 | 0.6 | 0.7 |

(Units: parts by weight)

Experimental Examples

A test method for each property measured in the present invention is as follows. Unless measurement conditions are stated otherwise, measurement was made at room temperature and atmospheric pressure.

In accordance with ASTM D-412, the compositions for dip molding according to Examples and Comparative Examples were molded to prepare dumbbell-shaped specimens.

The compositions for dip molding according to Examples and Comparative Examples were molded to prepare rectangular specimens with a width of 30 mm, a length of 135 mm, and a thickness 0.06 to 0.08 mm.

Tensile strength and Elongation rate: Each dumbbell-shaped specimen was elongated at 500 mm/min using a universal testing machine (UTM), and the applied tensile load and elongation rate when the specimen was broken were measured.

Stress retention (S/R): Each dumbbell-shaped specimen was elongated at 500 mm/min using a UTM so that an elongation rate reached 100%, then an initial tensile load ($\sigma_0$) and a tensile load after 6 minutes ($\sigma_6$) were measured, and stress retention was calculated by the following equation.

$$S/R(\%) = \frac{\sigma_6}{\sigma_0} \times 100$$

Durability: A pH 4 solution was prepared using citric acid and then maintained at 35° C. Each rectangular specimen having been elongated by 20% in a lengthwise direction was immersed in the solution. The specimen was elongated for 10 seconds so that an elongation rate reached 50%, maintained for 2 seconds, and then relaxed for 10 seconds so that an elongation rate reached 20%. While repeating this process, the time taken for the specimen to be broken was measured until up to 240 minutes for the specimens according to Examples 1 to 3 and up to 180 minutes for the other specimens.

Gel content: 5 g of the latex prepared in each of Preparation Example and Comparative Preparation Example was added to 200 mL of isopropyl alcohol under stirring to induce coagulation. The coagulum was filtered through a 120-mesh metal net and dried in a constant-temperature vacuum dryer set to 50±2° C. and 750±10 mmHg for an hour. Then, the resultant was allowed to cool to room temperature in a desiccator. 0.25 to 0.35 g of the dried specimen was accurately weighed with the precision of a 0.1 mg unit (W) and input into an Erlenmeyer flask, and 100 mL of methyl ethyl ketone (MEK) was added, and then stirring was performed for 2 hours. Afterward, the specimen was fully filtered through a filter paper. 20 mL of the filtrate was heated to evaporate MEK, then allowed to cool to room temperature in a desiccator, and accurately weighed with the precision of a 0.1 mg unit (Wf). The content of gel contained in the specimen was measured by the following equation, and an average value of two measurements was calculated to one decimal place.

$$\text{Gel Content}(\%) = 100 - \frac{W_f \times 5}{W_t} \times 100$$

TABLE 2

| Classification | Tensile strength (MPa) | Elongation rate (%) | S/R (%) | Durability (mins) | Gel content (%) |
|---|---|---|---|---|---|
| Example 1 | 40.5 | 652 | 33.0 | 240.0 | 48.2 |
| Example 2 | 37.0 | 680 | 28.3 | 240.0 | 0 |
| Example 3 | 28.2 | 738 | 31.4 | 240.0 | 16.8 |
| Example 4 | 4.7 | 1120 | 34.5 | 47.5 | 0 |
| Example 5 | 25.4 | 830 | 38.9 | 180.0 | 0 |
| Example 6 | 27.1 | 728 | 33.9 | 180.0 | 0 |
| Example 7 | 33.3 | 660 | 27.6 | 180.0 | 25.0 |
| Example 8 | 37.9 | 583 | 28.9 | 160.0 | 20.5 |
| Example 9 | 30.9 | 675 | 27.0 | 85.0 | 33.4 |
| Example 10 | 32.1 | 784 | 45.4 | 180.0 | 2.5 |
| Example 11 | 29.2 | 788 | 42.2 | 180.0 | 0 |
| Example 12 | 27.5 | 830 | 40.2 | 180.0 | 0 |
| Example 13 | 23.9 | 808 | 38.4 | 60.0 | 0 |
| Example 14 | 23.1 | 931 | 43.7 | 180.0 | 2.1 |
| Example 15 | 28.3 | 849 | 44.0 | 180.0 | 2.1 |
| Example 16 | 21.7 | 859 | 45.6 | 88.0 | 2.1 |
| Example 17 | 21.9 | 843 | 47.3 | 94.0 | 2.1 |
| Comparative Example 1 | 37.8 | 612 | 34.8 | 25.0 | 48.0 |
| Comparative Example 2 | 32.7 | 648 | 40.5 | 36.0 | 60.1 |
| Comparative Example 3 | 28.0 | 683 | 29.8 | 19.0 | 49.6 |
| Comparative Example 4 | 32.1 | 689 | 39.1 | 42.0 | 52.0 |
| Comparative Example 5 | 31.7 | 662 | 37.4 | 39.0 | 60.1 |
| Comparative Example 6 | 22.9 | 670 | 33.7 | 32.0 | 47.8 |
| Comparative Example 7 | 24.5 | 810 | 38.9 | 25.0 | 52.4 |
| Comparative Example 8 | 23.7 | 760 | 42.3 | 24.0 | 52.4 |

Referring to Table 2, the specimens according to Comparative Examples 1 to 8, which were prepared from the carboxylic acid-modified butadiene-nitrile-based copolymer latex according to Comparative Preparation Example, were excellent in tensile strength, an elongation rate, and stress retention but exhibited a durability of 19.0 to 42.0 minutes, that is, poor durability under actual use conditions.

On the other hand, the specimens according to Examples 1 to 17, which were prepared from the carboxylic acid-modified isoprene-nitrile-based copolymer latex according to Preparation Example, exhibited a durability of 45.0 minutes or more, that is, excellent durability under actual use conditions.

In addition, Examples 5 to 7 using methacrylic acid in an amount of 2 to 4 parts by weight based on 100 parts by weight of the monomers and Examples 10 to 12 using a molecular-weight control agent in an amount of 0.3 to 0.45 parts by weight based on 100 parts by weight of the monomers all exhibited a durability of 180 minutes or more, that is, remarkably excellent durability under actual use conditions. When Examples 14 to 17, which were prepared from the same latex, were compared, Examples 14 and 15, in which the total content of sulfur and a vulcanization accelerator was 2 parts by weight or more based on 100 parts by weight of the monomers, exhibited excellent vulcanization efficiency and accordingly excellent durability during actual use.

According to one aspect of the present invention, a latex composition for dip molding, which is used in the manufacture of a dip-molded article having excellent properties during actual use as well as during storage, can be provided.

However, it is to be understood that the effects according to various aspects of the present invention are not limited to the above-described effects but include all effects deducible from the configuration described in the detailed description of the present invention or in the claims.

The foregoing description of the present invention is intended for illustration, and it will be understood by those skilled in the art to which the present invention pertains that the present invention can be easily modified and implemented in various other forms without changing the technical spirit or essential features of the present invention. Therefore, it should be understood that the embodiments described above are only exemplary in all aspects and not limiting. For example, each of the constituents described as being one combined entity may be implemented separately, and similarly, constituents described as being separate entities may be implemented in a combined form.

It should be understood that the scope of the present invention is defined by the following claims and that all changes or modifications derived from the meaning and scope of the claims and their equivalents are included in the scope of the present invention.

What is claimed is:

1. A latex composition for dip molding, comprising a copolymer latex formed by polymerizing an isoprene monomer, an ethylenically unsaturated nitrile monomer, and an ethylenically unsaturated acid monomer,
   wherein the copolymer latex includes a copolymer formed by polymerizing 70 to 90 parts by weight of the isoprene monomer; 10 to 55 parts by weight of the ethylenically unsaturated nitrile monomer; and 1.5 to 3.5 parts by weight of the ethylenically unsaturated acid monomer,
   wherein the copolymer latex is formed by polymerization further using water, an emulsifier, a polymerization initiator, and a molecular-weight control agent,
   wherein the molecular-weight control agent is used in an amount of 0.3 to 0.45 part by weight based on 100 parts by weight of the total monomers of the copolymer latex,
   wherein a dip-molded article made of the latex composition for dip molding exhibits a durability test result of 180 minutes or more:
   [Durability Test Method]
   A dip-molded article with a width of 30 mm, a length of 135 mm, and a thickness of 0.06 to 0.08 mm is elongated by 20% in a lengthwise direction and immersed in a solution set to 35° C. and pH 4.0 to pH 4.3, and
   the molded article is elongated in a lengthwise direction for 10 seconds so that an elongation rate reaches 50%, maintained for 2 seconds, and then relaxed in a lengthwise direction for 10 seconds so that an elongation rate reaches 20%, and while repeating this process, the time taken for the molded article to be broken is measured.

2. The latex composition of claim 1, wherein the ethylenically unsaturated nitrile monomer is one or more selected from the group consisting of acrylonitrile, methacrylonitrile, fumaronitrile, α-chloronitrile, and α-cyanoethyl acrylonitrile.

3. The latex composition of claim 1, wherein the ethylenically unsaturated acid monomer is one or more selected from the group consisting of acrylic acid, methacrylic acid, itaconic acid, maleic acid, fumaric acid, maleic anhydride, citraconic anhydride, styrene sulfonate, monobutyl fumarate, monobutyl maleate, and mono-2-hydroxypropyl maleate.

4. The latex composition of claim 1, wherein the latex composition for dip molding further includes, based on 100 parts by weight of the total monomers of the copolymer latex, 0.1 to 1 part by weight of zinc oxide, 1 to 2 parts by weight of sulfur, and 0.3 to 1.5 parts by weight of a vulcanization accelerator.

5. The latex composition of claim 1, wherein the latex composition for dip molding further includes one or more additives selected from the group consisting of a chelating agent, a dispersant, a pH control agent, a deoxygenating agent, a particle size control agent, an anti-aging agent, and an oxygen scavenger.

6. The latex composition of claim 1, wherein the latex composition for dip molding has a solid content of 15 to 25 wt %.

7. The latex composition of claim 1, wherein a dip-molded article made of the latex composition for dip molding exhibits a durability test result of 180 minutes or more,
   a tensile strength of the dip-molded article is 10 MPa or more, and
   an elongation rate of the dip-molded article is 600% or more.

8. A dip-molded article made of the latex composition for dip molding according to claim 1.

9. The dip-molded article of claim 8, wherein the dip-molded article is a medical glove, a glove for processing agricultural and livestock products, an industrial glove, a condom, a catheter, or a molded article for health care.

* * * * *